(12) United States Patent
Farsad et al.

(10) Patent No.: US 11,092,485 B2
(45) Date of Patent: Aug. 17, 2021

(54) COMPACT SPECTROMETERS AND INSTRUMENTS INCLUDING THEM

(71) Applicant: PerkinElmer Health Sciences, Inc., Waltham, MA (US)

(72) Inventors: Mahsa Farsad, New Haven, CT (US); David Aikens, New Haven, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 47 days.

(21) Appl. No.: 16/541,917

(22) Filed: Aug. 15, 2019

(65) Prior Publication Data

US 2020/0049554 A1 Feb. 13, 2020

Related U.S. Application Data

(63) Continuation of application No. PCT/US2019/046175, filed on Aug. 12, 2019.

(60) Provisional application No. 62/717,255, filed on Aug. 10, 2018.

(51) Int. Cl.
| | |
|---|---|
| *G01J 3/28* | (2006.01) |
| *G01J 3/02* | (2006.01) |
| *G01J 3/18* | (2006.01) |
| *G02B 23/02* | (2006.01) |
| *G01J 3/12* | (2006.01) |

(52) U.S. Cl.
CPC .......... *G01J 3/0256* (2013.01); *G01J 3/0208* (2013.01); *G01J 3/1809* (2013.01); *G02B 23/02* (2013.01); *G01J 2003/1208* (2013.01)

(58) Field of Classification Search
CPC ...... G01J 3/0256; G01J 3/1809; G01J 3/0208; G01J 2003/1208; G01J 3/021; G01J 3/28; G02B 23/02; G02B 23/04; G02B 17/0892; G02B 17/0888; G01N 21/73
See application file for complete search history.

(56) References Cited

U.S. PATENT DOCUMENTS

| 4,820,048 A * | 4/1989 | Barnard ............... G01J 3/1809 250/372 |
| 5,565,983 A | 10/1996 | Barnard |
| 8,773,659 B2 * | 7/2014 | McClure .................. G01J 3/18 356/302 |
| 2002/0001079 A1 * | 1/2002 | Paolinetti ........... G02B 19/0085 356/326 |

FOREIGN PATENT DOCUMENTS

WO 2017/121583 A1 7/2017

OTHER PUBLICATIONS

Becker-Ross, H. et al. "Echelle spectrometers and charge-coupled devices", Spectrochimica Acta Part B (1997), pp. 1367-1375.
Nov. 28, 2019 (EP) Search Report and Written Opinion of PCT/US2019/046175.

* cited by examiner

*Primary Examiner* — Abdullahi Nur
(74) *Attorney, Agent, or Firm* — Banner & Witcoff, Ltd.

(57) ABSTRACT

A spectrometer with an unobstructed, Schmidt reflector is described. The spectrometer may include a Schmidt corrector and a dispersive element as separate components. Alternatively, the Schmidt corrector and dispersive element may be combined into a single optical component. The spectrometer may further include a field-flattener lens.

20 Claims, 11 Drawing Sheets

|  | A | B | | C | | D | |
|---|---|---|---|---|---|---|---|
|  |  | High Res | Low Res | High Res | Low Res | High Res | Low Res |
| Slit Height (μm) | 120 | 250 | 250 | 250 | 250 | 280 | 280 |
| Slit Width (μm) | 40 | 32 | 64 | 32 | 64 | 15 | 30 |
| # col | 10 | 7.7 | 7.7 | 7.7 | 7.7 | 6 | 6 |
| Etendue (μm²) | 48.0 | 134.9 | 269.9 | 134.9 | 269.9 | 116.7 | 233.3 |
| Ratio to A | 1.0 | 2.8 | 5.6 | 2.8 | 5.6 | 2.4 | 4.9 |
| Ratio to B UV | 0.18 | 1.00 | 1.00 | 1.00 | 1.00 | 0.86 | 0.86 |
| Total Efficiency | 13.06% | 7.35% | 7.35% | 7.86% | 7.86% | 21.53% | 21.53% |
| Etendue x efficiency | 6.3 | 9.9 | 19.8 | 10.6 | 21.2 | 25.1 | 50.2 |
| Throughput Ratio to A | 1.0 | 1.6 | 3.2 | 1.7 | 3.4 | 4.0 | 8.0 |
| Detection Limit Ratio to A | 1 | 1.3 | 1.8 | 1.3 | 1.8 | 2.0 | 2.8 |
| Throughput Ratio to B | 0.3 |  | 1 | 1.1 |  | 2.5 |  |
| Detection Limit Ratio to B |  |  | 1 | 1.0 |  | 1.6 |  |

| A | | B | | C | | D | |
|---|---|---|---|---|---|---|---|
| | Efficiency | | Efficiency | | Efficiency | | Efficiency |
| Collimator | 85.00% | Collimator | 85.00% | Collimator | 90.00% | Collimator | 90.00% |
| Echelle | 35.00% | Echelle | 35.00% | Echelle | 35.00% | Echelle | 35.00% |
| Double pass prism | 81.54% | Cross disperser | 74.25% | Cross disperser | 74.25% | Double pass prism | 84.81% |
| Imaging sphere | 85.00% | Sphere | 85.00% | Sphere | 90.00% | Sphere | 90.00% |
| Detector window | 90.45% | Flat | 85.00% | Flat | 90.00% | Field flat | 89.83% |
| Loss due to θ angle | 70.00% | Field flat | 89.83% | Field flat | 89.83% | | |
| | | Obscuration | 57.00% | Obscuration | 57.00% | | |
| | | Loss due to θ angle | 90.00% | Fold 1 | 90.00% | | |
| | | | | Fold 2 | 90.00% | | |
| Total Efficiency | 13.06% | Total Efficiency | 7.35% | Total Efficiency | 7.86% | Total Efficiency | 21.60% |

Figure 3B

| | A | B | | C | | D | |
|---|---|---|---|---|---|---|---|
| | | High Res | Low Res | High Res | Low Res | High Res | Low Res |
| Slit Height (μm) | 40 | 250 | 250 | 250 | 250 | 72 | 72 |
| Slit Width (μm) | 40 | 32 | 64 | 32 | 64 | 15 | 30 |
| f# col | 10 | 7.7 | 7.7 | 7.7 | 7.7 | 6 | 6 |
| Etendue (μm²) | 16.0 | 134.9 | 269.9 | 134.9 | 269.9 | 30.0 | 60.0 |
| Ratio to A | 1.0 | 8.4 | 16.9 | 8.4 | 16.9 | 1.9 | 3.8 |
| Ratio to B | 0.06 | 1.00 | 1.00 | 1.00 | 1.00 | 0.22 | 0.22 |
| Total Efficiency | 13.06% | 7.35% | 7.35% | 7.86% | 7.86% | 21.60% | 21.60% |
| Etendue x efficiency | 2.1 | 9.9 | 19.8 | 10.6 | 21.2 | 6.5 | 13.0 |
| Throughput Ratio to A | 1.0 | 4.8 | 9.5 | 5.1 | 10.2 | 3.1 | 6.2 |
| Detection Limit Ratio to A | 1 | 2.2 | 3.1 | 2.3 | 3.2 | 1.8 | 2.5 |
| Throughput Ratio to B | 0.1 | 1 | 1 | 1.1 | | 0.7 | |
| Detection Limit Ratio to B | | 1 | 1 | 1.0 | | 0.8 | |

Figure 4

|  | A | B | C | D |
|---|---|---|---|---|
|  |  | Low Res | Low Res | Low Res |
| Slit Height (µm) | 40 | 250 | 250 | 72 |
| Slit Width (µm) | 40 | 64 | 64 | 30 |
| # col | 10 | 16.67 | 16.67 | 6 |
| Etendue (µm²) | 16.0 | 57.6 | 57.6 | 60.0 |
| Ratio to A | 1.0 | 3.6 | 3.6 | 3.8 |
| Ratio to B | 0.28 | 1.00 | 1.00 | 1.04 |
| Total Efficiency | 20.48% | 27.98% | 24.00% | 33 % |
| Etendue x efficiency | 3.3 | 16.1 | 13.8 | 19.8 |
| Throughput Ratio to A | 1 | 4.9 | 4.2 | 6.1 |
| Detection Limit Ratio to A | 1 | 2.22 | 2.05 | 2.46 |
| Throughput Ratio to B |  | 1 | 0.86 | 1.23 |
| Detection Limit Ratio to B |  | 1 | 0.93 | 1.11 |

| A | | B | | C | | D | |
|---|---|---|---|---|---|---|---|
| | Efficiency | | Efficiency | | Efficiency | | Efficiency |
| Collimator | 85.00% | Collimator | 85.00% | Collimator | 90.00% | Collimator | 90.00% |
| Echelle | 50.00% | Echelle | 50.00% | Echelle | 50.00% | Echelle | 50.00% |
| Double pass prism | 86.88% | Prism (F2, 35.28 mm) | 89.00% | Prism (F2, | 89.00% | Double pass prism | 87.62% |
| Imaging sphere | 85.00% | Lens1-1 (BK7, 20.15) | 95.00% | Lens1-1 (BK7 | 95.00% | Sphere | 90.00% |
| Detector window | 93.22% | Lens1-2 (SF5, 7) | 93.00% | Lens1-2 (SF5 | 93.00% | Field flat | 93.21% |
| Loss due to θ angle | 70.00% | Lens2 (BK7, 16.8) | 92.00% | Lens2 (BK7 | 92.00% | | |
| | | Lens3 (BK7, 39.56) | 91.00% | Lens3 (BK7 | 91.00% | | |
| | | | | Fold 1 | 90.00% | | |
| | | | | Fold 2 | 90.00% | | |
| Total Efficiency | 20.48% | Total Efficiency | 27.98% | Total Efficiency | 24.00% | Total Efficiency | 33.08% |

| Element | λ (nm) | B Blaze function | D Blaze function | Ratio D/B |
|---|---|---|---|---|
| Al | 167.02 | 95.12% | 44.20% | 0.46 |
| P | 177.433 | 62.02% | 65.65% | 1.06 |
| S | 180.669 | 93.54% | 73.30% | 0.78 |
| As | 188.979 | 82.45% | 63.48% | 0.77 |
| Tl | 190.8 | 64.06% | 67.50% | 1.05 |
| As | 193.696 | 98.03% | 80.34% | 0.82 |
| Se | 196.026 | 49.19% | 40.47% | 0.82 |
| Pb | 216.999 | 70.28% | 41.22% | 0.59 |
| Pb | 220.353 | 93.22% | 98.00% | 1.05 |

602

| Element | λ (nm) | B Blaze function | D Blaze function | Ratio D/B |
|---|---|---|---|---|
| Al | 167.02 | 95.12% | 99.98% | 1.05 |
| P | 177.433 | 62.02% | 96.01% | 1.55 |
| S | 180.669 | 93.54% | 92.63% | 0.99 |
| As | 188.979 | 82.45% | 98.46% | 1.19 |
| Tl | 190.8 | 64.06% | 97.39% | 1.52 |
| As | 193.696 | 98.03% | 69.09% | 0.70 |
| Se | 196.026 | 49.19% | 97.40% | 1.98 |
| Pb | 216.999 | 70.28% | 94.89% | 1.35 |
| Pb | 220.353 | 93.22% | 73.62% | 0.79 |

Figure 6 f/1.4 refractive Schmidt f/2.6 reflective FF Schmidt f/8 reflective, unobstructive FF Schmidt f/12, 6.3° field of view Effective focal length = 100,
10° field of view f/4, 3.75° field of view Effective focal length = 1000,
3.9° field of view

COMPACT SPECTROMETERS AND INSTRUMENTS INCLUDING THEM

RELATED APPLICATIONS

The present application is a continuation of International Application No. PCT/US2019/046175 filed on Aug. 12, 2019, and titled "COMPACT SPECTROMETERS AND INSTRUMENTS INCLUDING THEM," which claims priority to U.S. Provisional Patent Application No. 62/717,255 filed on Aug. 10, 2018 and titled "COMPACT SPECTROMETERS AND INSTRUMENTS INCLUDING THEM," the disclosures of which are herein incorporated by reference in their entirety.

TECHNOLOGICAL FIELD

Certain configurations are described herein of a spectrometer that may be used to select one or more wavelengths of light.

BACKGROUND

There are many applications where it is desirable to detect the spectrum of light emitted from a light source or light emitted by a sample being probed by a light source. A spectrometer may be used to detect the spectrum of light. Spectrometers conventionally use a combination of optical elements to spatially separate light of different wavelengths such that an array of detectors that spatially resolves the light may determine the wavelength of the light based on the amount of light detected by each detector of the array of detectors.

SUMMARY

Spectrometers that are able to detect a wide range of light (e.g. both the ultraviolet and visible portions of a spectrum) are typically large and use multiple, narrowband detectors with one or more optical splitters to direct at least a portion of an optical pathway to the narrowband detectors. In some cases, the optical splitters are half-silvered mirrors that permit passage of a first portion of light, such as the ultraviolet portion, to a first detector and direct a second portion of light, such as the visible portion, to a second detector. In other cases, the optical splitters may be full-silvered mirrors interposed in only a part of a light pathway and direct only a portion of light (e.g., an ultraviolet portion of a spectrum) to a detector sensitive to a limited range of wavelengths (e.g., only ultraviolet wavelengths). Some spectrometers use a flat mirror to direct the UV portion of the light spectrum to a separate detector. In other spectrometers, a reflecting mirror may include a hole so that a portion of the light passes through the reflecting mirror to a first detector while the remaining portion of light reflects off the mirror and is directed to a second detector. In some cases, the hole may be in a Schmidt corrector such that a portion of light is not corrected by the Schmidt corrector and is directed to a separate detector. Such combinations of optical elements, however, increase the footprint of the spectrometer so that it is impractical for use in space-constrained environments where a large spectrometer may displace other useful instruments. Further, the use of optical splitters or other optical components may reduce the overall optical efficiency of the system.

One or more aspects described herein relate to the optical design and/or layout of a spectrometer for OES with an off-axis Schmidt telescope (or an imaging system including a Schmidt telescope) that simultaneously captures the UV and the visible spectrum on a single detector (instead of two) without sacrificing performance. The spectrometer may include an image sensor at the image plane and may be integrated with a plasma source through a set of transport optics at the entrance slit. A sample detectable range for one example of a spectrometer may include a wavelength range from about 167 nm to about 1200 nm (±5% or ±10%). The spectrometer architecture and imager described herein may also provide a reduction in size and/or an improvement in optical efficiency while reducing a number of imaging sensors. In one or more examples, the spectrometer described herein may achieve greater optical efficiency by using a single detector (instead of two detectors) to capture portions of the visible and ultraviolet spectrum (e.g., 167 to 1200 nm) while minimizing an effect on performance.

According to one or more aspects, the disclosure may relate to an optical spectrometer. The spectrometer includes an aperture, a collimator, an Echelle grating, an off-axis Schmidt telescope, and a detector. The collimator is optically coupled to the aperture and the Echelle grating. The off-axis Schmidt telescope is optically coupled to the Echelle grating, and the detector. Light entering the spectrometer through the aperture is directed to the detector. Further, light incident on the detector comprises a plurality of wavelengths that are spatially separated across the ultraviolet light spectrum and the visible light spectrum. In some implementations, the plurality of wavelengths are spatially separated across a spectral range of about 167 nm to about 1200 nm.

In some implementations, the off-axis Schmidt telescope may further include a Schmidt corrector, a dispersive element, and a mirror. The mirror may be a spherical mirror. In some implementations, a field flattening lens may be positioned between the mirror and the detector. The field flattening lens may be optically coupled to the mirror and the detector. The dispersive element may include a prism. In some implementations, the Schmidt corrector may be an aspheric surface on one face of the prism. In other implementations, the Schmidt corrector may be a reflective mirror that is separate and independent of the prism. The detector may be configured to detect visible light. The detector may be configured to detect ultraviolet light. The detector may be configured to detect infrared light. The prism may include a double-pass reflective prism. In some implementations, the spectrometer may receive light from an inductively coupled plasma (ICP) system.

Additional aspects, configurations, embodiments and examples are described in more detail below.

BRIEF DESCRIPTION OF THE SEVERAL VIEWS OF THE DRAWINGS

Certain specific configurations of a spectrometer and components thereof, are described below with reference to the accompanying figures in which:

FIGS. 3A and 3B show a comparison of throughputs and possible detection limits of an example spectrometer in a high throughput mode.

FIG. 4 shows a comparison of expected UV spectrum handling characteristics of an example spectrometer in a simultaneous operation mode.

FIGS. 5A and 5B shows a comparison of expected visible light spectrum handling characteristics of an example spectrometer in the simultaneous operation mode.

FIG. 6 shows detection sensitivities based on modifying an out-of-plane angle of the echelle (e.g., a gamma angle).

Figure 1:
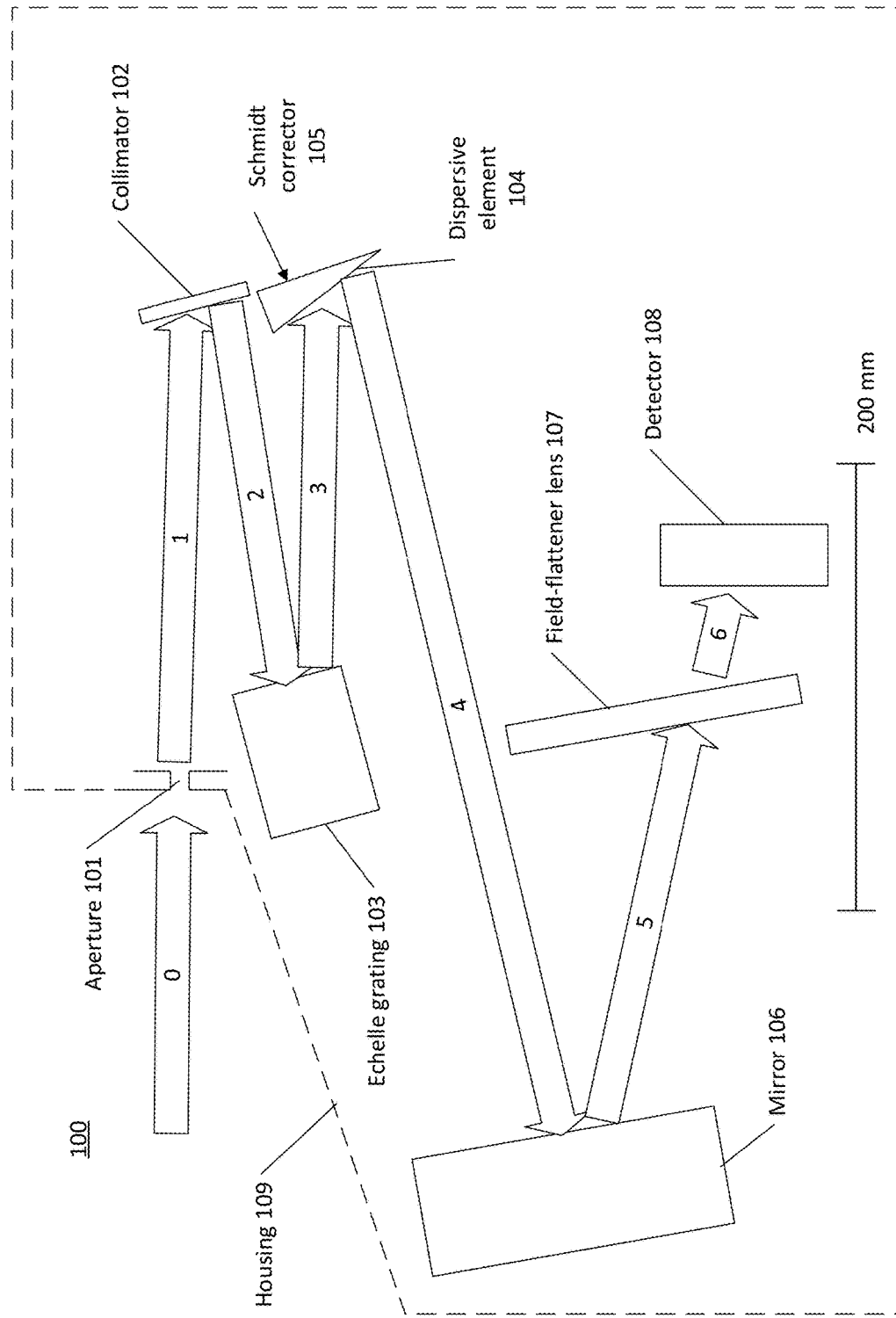
FIG. 1 shows an example spectrometer in accordance with aspects of the disclosure.

It will be recognized by the skilled person in the art, given the benefit of this disclosure, that the exact arrangement, sizes and positioning of the components in the figures is not necessarily to scale or required. The particular sizes and angles of one component relative to another component may vary to provide a desired response or output from the component or the optical spectrometer comprising the component.

DETAILED DESCRIPTION

Certain aspects, configurations, embodiments, and examples of a spectrometer are described. The inventors have recognized and appreciated that spectral overlap is commonly observed in conventional spectrometers, which reduces accuracy, lowers detection limits, and may limit a resolution on a final image plane. Further, conventional spectrometers are generally large, which may make them impractical to use in space-constrained environments where, a large spectrometer displaces other useful instruments. Accordingly, the inventors have recognized and appreciated that a low cost, high performance, and compact design spectrometer for optical emission spectroscopy (OES) and other applications is desired.

One or more aspects described herein relate to the optical design and/or layout of a spectrometer for OES with an off-axis Schmidt telescope (or an imaging system including a Schmidt telescope) that simultaneously captures the UV and the visible spectrum on a single detector without sacrificing performance. The spectrometer may include an image sensor at the image plane and may be integrated with a plasma source through a set of transport optics at the entrance slit. A sample detectable range for one example of a spectrometer may include a wavelength range from about 167 nm to about 1200 nm (±5% or ±10%).

One or more aspects of a spectrometer described herein may include a Schmidt telescope or components related to a Schmidt telescope design. For example, a spectrometer may use an obstructed concave mirror from a Schmidt telescope design to improve the optical efficiency of the spectrometer. Some aspects relate to a spectrometer having one or more of the following characteristics: a wavelength resolving range of 167-1200 nm, a spectral resolution of 5-6 pm (e.g., for As193—arsenic at a wavelength of 193 nm) and one point per peak in a resolution mode, an optical throughput of current high resolution spectrometers, detector dimensions in a 28 mm×28 mm format, for instance, with a 15 μm square pixel size, and capable of providing faster measurements than sequential monochromatic spectrometers.

Additionally, one or more aspects of a spectrometer described herein may include one or more aspheric surfaces, small optics, and an Echelle grating. By increasing the wavelengths resolvable by a spectrometer, a spectrometer as described herein may be faster in analyzing a sample than analyzing that sample using sequential measurements in monochromatic spectrometers. Further, through using one or more aspheric surfaces, a higher resolution and optical throughput may be achieved compared to spectrometers using only spherical and parabolic imagers.

In one or more examples, the spectrometer described herein may be used for capturing other regions of the spectrum (e.g., infrared) by modifying various aspects of the design including one or more of, but not limited to, slit size, plane angles, optical parameters of reflecting/refractive elements, sensor size, and the like. In one or more examples, an OES system described herein may be used with an inductive coupled plasma (ICP) as a light source. Similarly, the OES system described herein may be used with optical absorption spectroscopy or any other type of spectroscopy.

FIG. 1 shows an example spectrometer 100 according to one or more aspects. The spectrometer 100 may include a housing 109 (shown by dashed lines) with an aperture 101, a collimator 102, an Echelle grating 103, a dispersive element 104, a Schmidt corrector 105, a mirror 106, a field-flattening lens 107, and a detector 108. An optical input, such as light comprising a plurality of different wavelengths, enters the spectrometer 100 through the aperture 101 in the housing 109. In some implementations, the aperture 101 may be a slit. In some implementations, the spectrometer 100 may be part of an inductively coupled plasma (ICP) spectrometer and the aperture 101 may receive light from an inductively coupled plasma (ICP) system wherein samples are injected into a plasma via a sample introduction device. The sample introduction device may be fluidically coupled to a torch. An induction device may provide radio frequency energy into the torch to sustain an inductively coupled plasma in the torch. The aperture 101 may be optically coupled to the inductively coupled plasma in the torch and may receive light emission from analyte species in the inductively coupled plasma in the torch.

The aperture 101 is optically coupled to the collimator 102. Initial light from a light source is identified by arrow labeled "0". Light entering the aperture 101 is directed to the collimator 102, as shown in FIG. 1 by an arrow labeled "1" pointing from the aperture 101 to the collimator 102. The collimator 102 is optically coupled to the Echelle grating 103. The light incident on the collimator 102 is reflected and directed to the Echelle grating 104 as shown in FIG. 1 by the arrow labeled "2" that points from the collimator 102 to the Echelle grating 103. The Echelle grating 103 may be a typical Echelle grating comprising a plurality of gratings having widths about the same as the wavelength of the light, resulting in diffraction of the incident light. For example, the Echelle grating 103 may be a reflective grating. With reflective gratings, the reflective portion may be tilted (blazed) to scatter a majority of the light into a desired direction of interest (and into a specific diffraction order). For multiple wavelengths of light, the same general result occurs, but it is possible for longer wavelengths of a higher order to overlap with the next order(s) of a shorter wavelength. In an Echelle grating, this behavior is deliberately selected and the blaze is optimized for multiple overlapping higher orders. The exact blaze angle used may depend on the system level specifications of the spectrometer. The resulting optical output from the Echelle grating comprises stripes with different, but overlapping, wavelength ranges. The downstream optical elements may be used to provide spatial separation in a direction perpendicular to the Echelle grating's diffraction plane to permit detection of each wavelength of light present in an incident optical input received by the spectrometer.

The Echelle grating 103 is optically coupled to the dispersive element 104. The Echelle grating 103 receives the dispersed light from the dispersive element 104. The light incident on the Echelle grating 103 is further spectrally dispersed and directed towards the dispersive element 104 as shown in FIG. 1 by the arrow labeled "3" pointing from the Echelle grating 103 to the dispersive element 104. In some implementations, the dispersive element 104 may be a prism.

The dispersive element 104 is optically coupled to the Schmidt corrector 105. In some implementations, the Schmidt corrector 105 may be a refractive optic. In some implementations, the Schmidt corrector 105 may be a refractive optic that is integrated with the dispersive element 104. The Schmidt corrector 105 may be an aspheric surface on one face of the dispersive element 104. In such implementations, the Schmidt corrector 105 may be a reflective mirror that is independent of and separated from the dispersive element 104. For example, the Schmidt corrector 105 may be a reflective mirror that is positioned behind the dispersive element 104 (where light passes through the dispersive element 104) or used in an adjusted configuration with additional and/or alternative optics. In another example, the Schmidt corrector 105 may be a refractive component placed before the dispersive element 104 in light path labeled "3" or after the dispersive element in light path labeled "4". In yet further embodiments, the Schmidt corrector 105 may receive light through the path labeled "3", direct it to the dispersive element 104, receive dispersed light from the dispersive element 104, and direct light passing again through the Schmidt corrector 105 to the path labeled "4".

The dispersive element 104 may be optically coupled to the mirror 106 (directly or indirectly). The dispersive element 104 may be an optical element that disperses light. In some implementations, the dispersive element 104 may be a prism, a double-pass refractive prism, a double-pass reflective prism, a reflective grating, or a grism. In some implementations, the dispersive element 104 may be a cross-disperser. The orientation of a dispersion plane of the dispersive element 104 may be perpendicular to the dispersion plane of light from echelle grating 304. This perpendicular orientation of dispersal planes creates a cross-dispersion effect where previously dispersed light is dispersed again but with a different dispersion plane. In some implementations, the mirror 106 may be a spherical mirror or represent a portion of a spherical mirror.

The mirror 106 is optically coupled to the field flattener lens 107. The field flattener lens 107 is optically coupled to the detector 108. The mirror 106 receives the dispersed light from the dispersive element 104/Schmidt corrector 105 as shown in FIG. 1 by the arrow labeled "4" pointing from the dispersive element 104 to the mirror 106. The mirror 106 reflects the incident light to the detector 108 through the field-flattening lens 107, as shown in FIG. 1 by the arrow labeled "5" pointing from the mirror 106 to the field-flattening lens 107 and the arrow labeled "6" pointing from the field-flattening lens 107 to the detector 108. The detector 108 may be any detector that can spatially resolve light incident upon the detector 108. In some implementations, the detector 108 may be a charged coupled device (CCD) camera or a complementary metal oxide semiconductor (CMOS) detector. The light incident on the detector 108 comprises wavelengths across a wide spectrum, thereby permitting a wider range of light to be detected by the detector 108.

In one example, the collimator 102 may include an off-axis parabola, with f # of 6, a focal length of 200 mm, an aperture of approximately 35 mm, and 10 to 15 degrees off-axis angle. The Echelle grating 103 may be an RGL model 53-*-127E. The blaze angle of the Echelle grating 103 may be 63 degrees and have a groove density of 87 l/mm. Further, the dispersive element 104 may be a Schmidt corrector coupled to a double pass reflective prism. The prism may be UV grade fused silica and have an apex angle of 19 degrees.

Figure 2:
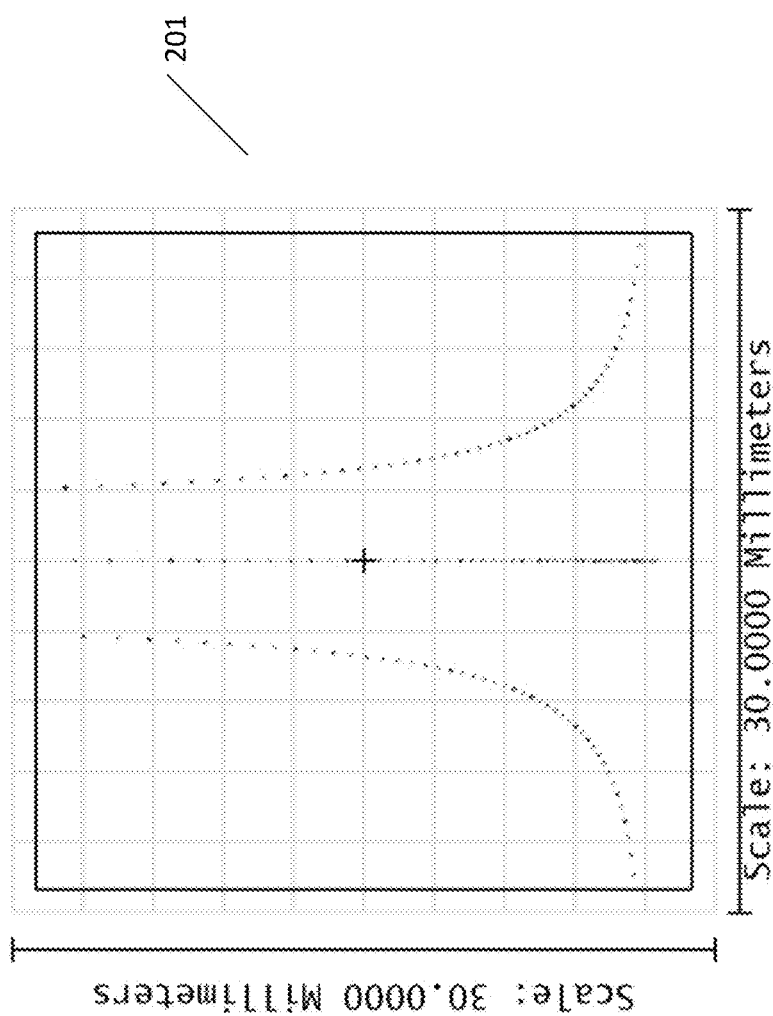
FIG. 2 shows an example Echellogram corresponding to an example spectrometer.

FIG. 2 shows an example Echellogram 201 corresponding to a spectrometer in accordance with one or more aspects of the disclosure. Referring back to FIG. 1, an optical input, such as light, enters the spectrometer 100 through the aperture 101. In some implementations, the spectrometer 100 may be part of an inductively coupled plasma (ICP) spectrometer and the aperture 101 may receive light from an inductively coupled plasma (ICP) system wherein samples are injected into a plasma via a sample introduction device. The sample introduction device may be fluidically coupled to a torch. An induction device may provide radio frequency energy into the torch to sustain an inductively coupled plasma in the torch. The aperture 101 may be optically coupled to the inductively coupled plasma in the torch and may receive light emission from analyte species in the inductively coupled plasma in the torch. After the light enters the spectrometer 100 through the aperture 101, the different wavelengths of light are spatially separated by the various optical components of the spectrometer 100 and directed to the detector 108 and thus, the individual wavelengths of the light emitted by analyte species may be detected at the detector 108. The Echellogram 201 shows emission intensities across a spectral range of 167 nm to over 850 nm on a detector, such as the detector 108 in FIG. 1.

FIG. 3A shows a table 301 of numerical comparisons between spectrometers A-C in high and low resolutions with computed values of a spectrometer D, where spectrometers A-C are conventional spectrometers and spectrometer D is an embodiment of the present application. Only one resolution is shown for spectrometer A. Sample efficiencies for spectrometers A-C are compared with computed values of a spectrometer D implemented according to one or more aspects discussed in FIG. 1. For instance, the values and efficiencies for spectrometer D may be computed based on an f-stop of f/6 and an effective focal length of 200 mm. For spectrometers B-D, values associated with a high resolution (narrower slit width) operation and a low resolution (wider slit width) operation are shown (with values for spectrometer D being computed). The values in table 301 for spectrometer D may be based on a slit height of 280 am with slit widths of 15 am for high resolution and 30 am for low resolution. The total efficiency 302 of spectrometer D in high and low resolution is higher than each of the total efficiencies for spectrometers A-D. The range of echelle orders in the UV spectrum are well separated and may be used for high optical throughput spectroscopy. FIG. 3B shows a table 305 of various efficiencies of the optical components of the spectrometers A-D.

FIG. 4 shows a comparison 401 in the UV spectrum of spectrometers A-C with computed values for a spectrometer D, where spectrometers A-C are conventional spectrometers and spectrometer D is an embodiment of the present application. For spectrometer A, only one resolution is shown. For spectrometers B-D, values associated with a high resolution (narrower slit width) operation and a low resolution (wider slit width) operation are shown (with values for spectrometer D being computed). For example, with slit height of 72 am for spectrometer D, all the echelle orders are expected to be resolved. In other words, the slit height may be selected to ensure all echelle orders are well separated.

The throughput ratio compared to conventional spectrometer A in simultaneous mode for UV wavelengths is 3.1. The throughput ratio compared to conventional spectrometer B in simultaneous mode for UV wavelengths is 0.7. One option to improve this difference with respect to spectrometer B is to use extra space in the physical footprint to include additional processing or separate processing of the wavelengths. With a sample slit height of 110 am, equal throughput to the conventional spectrometers may be achieved as echelle orders for λ<460 nm may be resolved. The slit height in this mode is shorter than the high throughput mode. The total efficiency 402 of spectrometer D in high and low resolution is higher than the total efficiency observed for spectrometers A-D.

FIG. 5A shows comparison 501 in the simultaneous modes of operation of spectrometers A-C with computed values of spectrometer D in the visible spectrum. With slit height of 72 am, echelle orders may be resolved for spectrometer D and the throughput is similar to that of the conventional spectrometers A-C. The visible mode may not have a high throughput mode because the visible orders may not be as well separated in the low resolution, high throughput mode. FIG. 5B shows a comparison 502 of the efficiencies of the optical components of the spectrometers A-D.

FIG. 6 shows tables 601 and 602 with the echelle efficiencies of specific wavelengths computed for spectrometers B and D. The specific wavelengths correspond to various elements in samples. In table 601, the echelle efficiencies (blaze functions) are computed based on modifying the out of plane angle of an Echelle grating of spectrometer D at 8 degrees. In table 602, the echelle efficiencies (blaze functions) are computed based on modifying the out of plane angle of an Echelle grating in spectrometer D at 9.5 degrees. Tables 601 and 602 also show the ratio of the echelle efficiency of spectrometer B to spectrometer D for each of the specific wavelengths.

Figure 7:
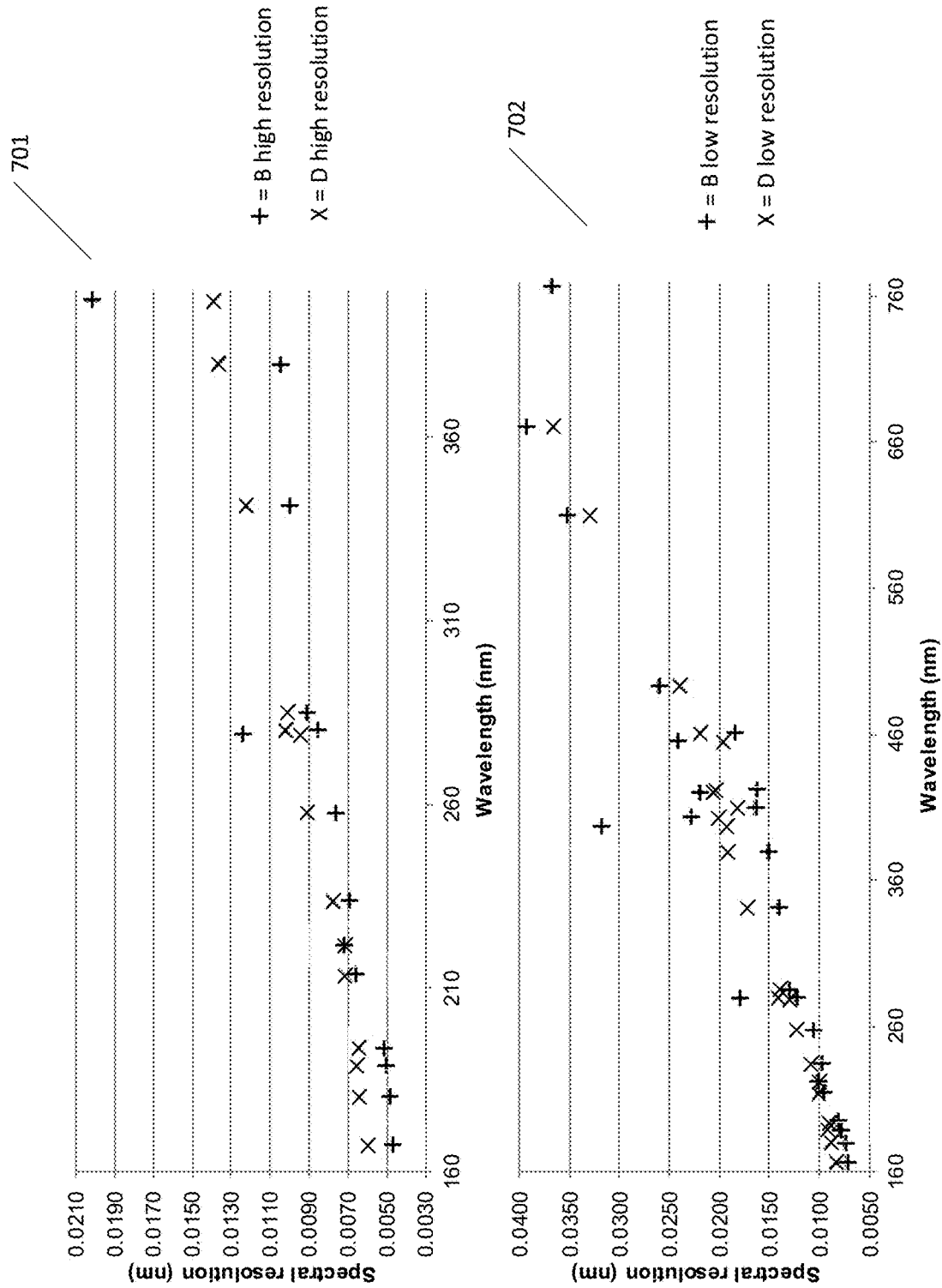
FIG. 7 shows a comparison of spectral resolutions.

FIG. 7 shows an expected comparison between spectrometers B and D of spectral resolutions at a high resolution in table 701 and at low resolution in table 702 over a series of wavelengths, where spectrometer B is a conventional spectrometer and spectrometer D is an embodiment of the present application. The experimental values for spectrometer D correspond to an implementation according to one or more aspects discussed in FIG. 1. The experimental values of resolution per wavelength shown in FIG. 7 are the root sum of squares (RSS) of the spectral slit width, pixel width, worst case root mean square (RMS) spot radius (=pixel size), and the physical width of the line. Also, a high resolution mode is possible for visible wavelength using the system of FIG. 1.

Figure 8A:
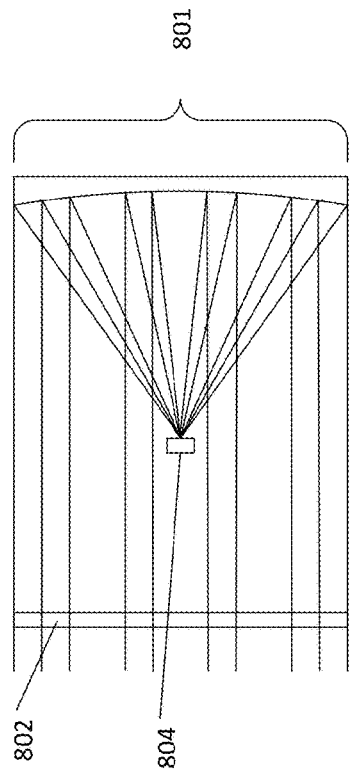
FIGS. 8A through 8C show examples of Schmidt telescopes.

FIGS. 8A-8D show optical layouts for a spectrometer according to FIG. 1, where the dispersive element 104 is implemented as a prism and the Schmidt corrector 105 is on the prism. In FIG. 8A, the system 801 may include one piano aspheric corrector 802 and a spherical mirror 803. Speeds up to f/1 and fields up to 8 degrees may be possible. As refractive Schmidt plate is not usable in all situations, a reflective Schmidt design may be used and provide similar performance.

Figure 8B:
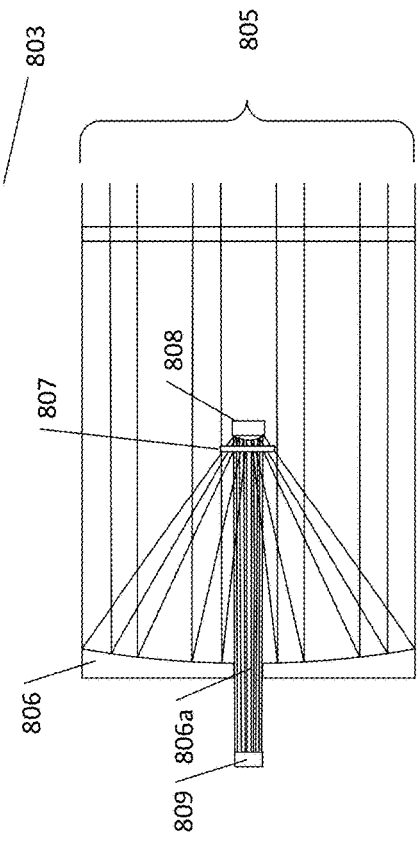

In FIG. 8B, system 805 may include a Schmidt reflector 806 with a hole 806a, a field flattener (FF) lens 807, a reflector 808, and a detector 809. The system of FIG. 8B may achieve larger fields of view at a similar speed as compared to that of FIG. 8A, albeit somewhat slower (from f/1.4 to f/2.6). An example of FIG. 8B may include a reflective, field flattened Schmidt with f/2.6, 7 degree field of view with a 200 mm efl. However, obscuration of the light paths in the Schmidt design of FIG. 8B is undesirable as it reduces throughput and increases scattering (e.g., increases noise).

Figure 8C:
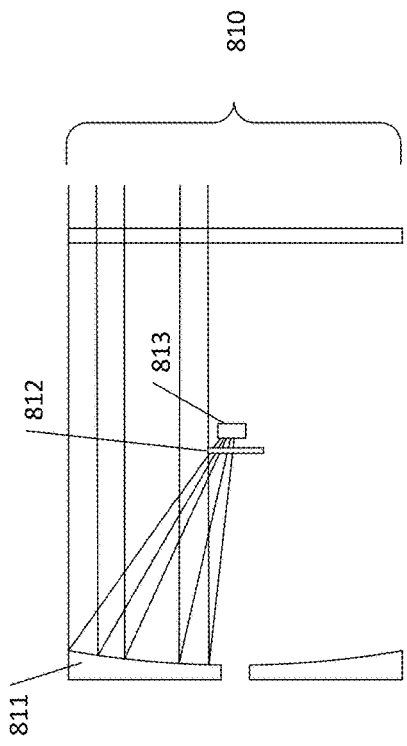

In FIG. 8C, system 810 shows an off-axis Schmidt configuration that eliminates the obscuration. Roughly, one third of the speed may be achieved. For example, system 810 may include a Schmidt reflector 811, a field flattener lens 812, and a detector 813.

Figure 9B:
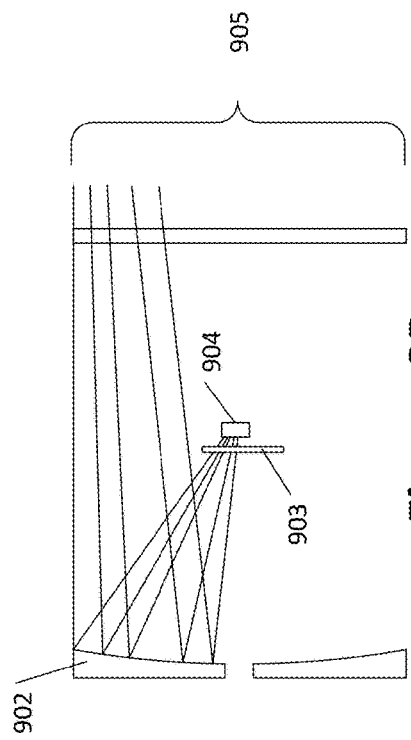
FIGS. 9A through 9D show characteristics of various unobstructed, reflective Schmidt telescope designs.
Figure 9D:
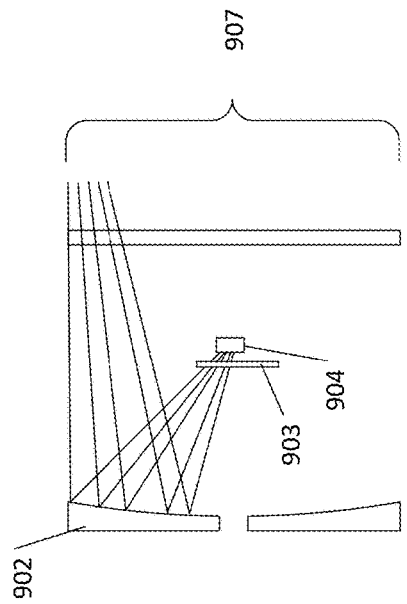
Figure 9A:
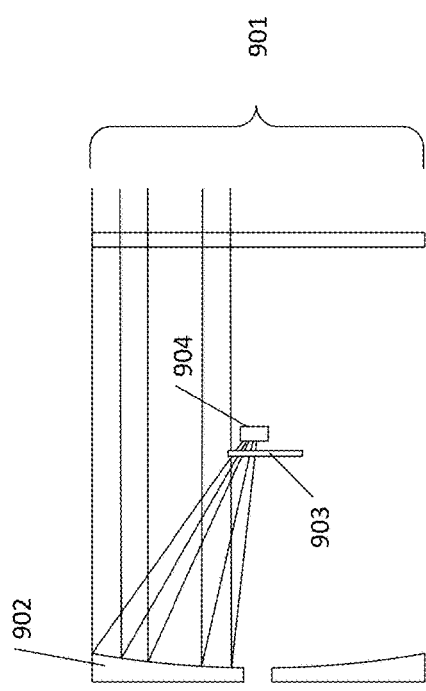
Figure 9C:
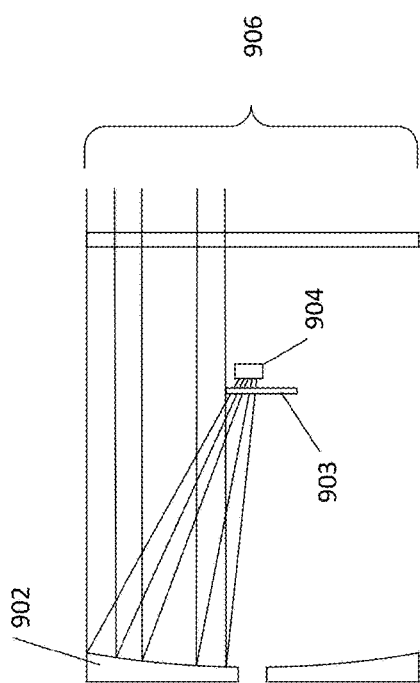

FIGS. 9A-9D shows characteristics of various unobstructed reflective Schmidt designs. Each of FIGS. 9A-9D show Schmidt systems with a Schmidt reflector 902, a field flattener 903, and a detector 904. In FIGS. 9A-9D, the maximum field of view is evaluated which can be achieved using, for instance, an rms spot radius at 8.0-8.2 am across the field. In FIG. 9A, the system 901 may have an effective focal length of 670 mm with an f-stop of f/6 using an unobscured, field flattened, reflective Schmidt design. The maximum field of view may be 3.75 degrees. In FIG. 9B, the system 902 may also have an effective focal length of 670 mm with an f-stop of f/12. The maximum field of view may be 6.3 degrees. In FIG. 9C and FIG. 9D, both examples may have a f-stop of f/6. In FIG. 9C, the effective focal length is 1000 mm, resulting in a maximum of a 3.9 degree field of view. In FIG. 9D, the effective focal length is 100 mm, resulting in a maximum of a 10 degree field of view. In short, increasing the f-stop results in increasing the field of view. Also, decreasing the focal length increases the field of view.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. An optical spectrometer comprising:
   an aperture;
   a collimator;
   an Echelle grating;
   an off-axis Schmidt telescope comprising a reflective Schmidt corrector; and
   a detector,
   wherein the collimator is optically coupled to the aperture and the Echelle grating,
   wherein the off-axis Schmidt telescope is optically coupled to the Echelle grating and to the detector,
   wherein light entering the spectrometer through the aperture is directed to the detector, and
   wherein light incident on the detector comprises a plurality of wavelengths that are spatially separated across the ultraviolet light spectrum and the visible light spectrum.

2. The optical spectrometer according to claim 1, wherein the off-axis Schmidt telescope further comprises:
   a dispersive element; and
   a mirror.

3. The optical spectrometer according to claim 2, wherein the mirror comprises a spherical mirror.

4. The optical spectrometer according to claim 2, further comprising:
   a field flattening lens positioned between the mirror and the detector,
   wherein the detector and the field flattening lens are optically coupled to the mirror.

5. The optical spectrometer according to claim 2, wherein the dispersive element comprises a prism, and wherein the Schmidt corrector is an aspheric surface on one face of the prism.

6. The optical spectrometer according to claim 2, wherein the dispersive element comprises a prism, and wherein the Schmidt corrector is separate and independent of the prism.

7. The optical spectrometer according to claim 6, wherein the Schmidt corrector is a reflective mirror.

8. The optical spectrometer according to claim 1, wherein the detector is configured to detect visible light.

9. The optical spectrometer according to claim 1, wherein the detector is configured to detect ultraviolet light.

10. The optical spectrometer according to claim 1, wherein the detector is configured to detect infrared light.

11. The optical spectrometer according to claim 2, wherein the dispersive element comprises a double-pass reflective prism.

12. The optical spectrometer according to claim 1, wherein the spectrometer receives light from an inductively coupled plasma (ICP) system.

13. The optical spectrometer according to claim 1, wherein the plurality of wavelengths are spatially separated across a spectral range of about 167 nm to about 1200 nm.

14. The optical spectrometer according to claim 1, wherein the off-axis Schmidt telescope is directly optically coupled to the Echelle grating.

15. An optical spectrometer comprising:
an aperture;
a collimator;
an Echelle grating;
an off-axis Schmidt telescope comprising:
   a dispersive element comprising a prism;
   a Schmidt corrector comprising an aspheric surface on one face of the prism; and
   a mirror; and
a detector,
wherein the collimator is optically coupled to the aperture and the Echelle grating,
wherein the off-axis Schmidt telescope is optically coupled to the Echelle grating and to the detector,
wherein light entering the spectrometer through the aperture is directed to the detector, and
wherein light incident on the detector comprises a plurality of wavelengths that are spatially separated across the ultraviolet light spectrum and the visible light spectrum.

16. The optical spectrometer according to claim 15, wherein the detector is configured to detect at least one of visible light, ultraviolet light, or infrared light.

17. The optical spectrometer according to claim 15, wherein the mirror comprises a spherical mirror.

18. An optical spectrometer comprising:
an aperture;
a collimator;
an Echelle grating;
an off-axis Schmidt telescope comprising:
   a dispersive element comprising a prism;
   a Schmidt corrector comprising a reflective mirror, wherein the Schmidt corrector is separate and independent of the prism; and
   a mirror; and
a detector,
wherein the collimator is optically coupled to the aperture and the Echelle grating,
wherein the off-axis Schmidt telescope is optically coupled to the Echelle grating and to the detector,
wherein light entering the spectrometer through the aperture is directed to the detector, and wherein light incident on the detector comprises a plurality of wavelengths that are spatially separated across the ultraviolet light spectrum and the visible light spectrum.

19. The optical spectrometer according to claim 18, wherein the detector is configured to detect at least one of visible light, ultraviolet light, or infrared light.

20. The optical spectrometer according to claim 18, wherein the mirror comprises a spherical mirror.

* * * * *